(12) United States Patent
Bastide et al.

(10) Patent No.: US 10,701,024 B2
(45) Date of Patent: *Jun. 30, 2020

(54) BLINDER AVOIDANCE IN SOCIAL NETWORK INTERACTIONS

(71) Applicant: International Business Machines Corporation, Armonk, NY (US)

(72) Inventors: Paul Bastide, Boxford, MA (US); Liam Harpur, Dublin (IE); Robert E. Loredo, N. Miami Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/223,404

(22) Filed: Dec. 18, 2018

(65) Prior Publication Data

US 2019/0124036 A1    Apr. 25, 2019

Related U.S. Application Data

(63) Continuation of application No. 15/853,953, filed on Dec. 25, 2017, now Pat. No. 10,158,599, which is a (Continued)

(51) Int. Cl.
*G06F 15/173* (2006.01)
*H04L 12/58* (2006.01)
(Continued)

(52) U.S. Cl.
CPC .............. *H04L 51/32* (2013.01); *G06F 3/013* (2013.01); *G06F 3/0483* (2013.01);
(Continued)

(58) Field of Classification Search
CPC .... H04L 29/08072; H04L 29/06; H04L 51/32
(Continued)

(56) References Cited

U.S. PATENT DOCUMENTS 7,194,693 B2      3/2007  Cragun et al.
8,694,298 B2 *    4/2014  Childers ............... E21B 21/106
                                                    703/10

(Continued)

OTHER PUBLICATIONS

IBM: List of IBM Patents or Patent Applications Treated as Related (Appendix P), Feb. 3, 2020, 2 pages.

*Primary Examiner* — Khanh Q Dinh
(74) *Attorney, Agent, or Firm* — L. Jeffrey Kelly

(57) ABSTRACT

A method, system and computer program product for blinder avoidance in social networking interactions includes executing a social networking data processing system in memory of a host computing system to provide a social networking service to different users in a social network. The method also includes defining in memory of the host computing system a user interface interaction for a user interface of the social networking service, and a corresponding user interface change in connection with a presentation of a status update for a user in different streams of other users of the social networking service. In response to detecting the user interface interaction with respect to a stream of status updates presented to one of the other users, the corresponding user interface change is performed in the user interface in connection with the presentation of the status update for the user in the stream.

18 Claims, 2 Drawing Sheets

Related U.S. Application Data continuation of application No. 14/631,811, filed on Feb. 25, 2015, now Pat. No. 9,882,861.

(51) Int. Cl.

| | | |
|---|---|---|
| *G06F 3/0485* | (2013.01) | |
| *G06F 3/0483* | (2013.01) | |
| *G06F 3/01* | (2006.01) | |
| *H04L 29/08* | (2006.01) | |
| *G06Q 50/00* | (2012.01) | |
| *G06Q 30/02* | (2012.01) | |

(52) U.S. Cl.
CPC ....... *G06F 3/0485* (2013.01); *G06Q 30/0241* (2013.01); *G06Q 50/01* (2013.01); *H04L 29/08072* (2013.01); *H04L 67/22* (2013.01); *H04L 69/329* (2013.01)

(58) Field of Classification Search
USPC .......... 709/220, 224, 226, 228, 232
See application file for complete search history.

(56) References Cited

U.S. PATENT DOCUMENTS

| | | | |
|---|---|---|---|
| 8,738,442 B1 * | 5/2014 | Liu | G06Q 30/0267 705/14.4 |
| 8,964,298 B2 | 2/2015 | Haddick | |
| 9,009,249 B2 | 4/2015 | Redfern | |
| 9,407,711 B2 | 8/2016 | Bayen | |
| 9,530,167 B2 | 12/2016 | Tseng | |
| 9,547,998 B2 | 1/2017 | Sadeh-Koniecpol | |
| 9,588,638 B2 | 3/2017 | Carter | |
| 9,648,117 B2 | 5/2017 | Bayen | |
| 9,794,359 B1 * | 10/2017 | Lessin | G06Q 50/01 |
| 9,882,861 B2 * | 1/2018 | Bastide | H04L 51/32 |
| 10,009,345 B2 | 6/2018 | Pearlman | |
| 10,158,599 B2 * | 12/2018 | Bastide | H04L 51/32 |
| 10,268,342 B2 * | 4/2019 | Foss | G06F 3/0482 |
| 10,466,876 B2 * | 11/2019 | Wang | G06F 3/04883 |
| 2011/0119258 A1 | 5/2011 | Forutanpour et al. | |
| 2013/0024788 A1 | 1/2013 | Olsen et al. | |
| 2013/0097180 A1 | 4/2013 | Tseng | |
| 2013/0127980 A1 * | 5/2013 | Haddick | G06F 3/013 348/14.08 |
| 2013/0278631 A1 * | 10/2013 | Border | G06F 3/04842 345/633 |
| 2014/0040300 A1 | 2/2014 | Narayanan | |
| 2014/0040761 A1 | 2/2014 | Liu | |
| 2014/0222912 A1 * | 8/2014 | St. Clair | H04L 67/22 709/204 |
| 2014/0258158 A1 | 9/2014 | Levy | |
| 2014/0274307 A1 * | 9/2014 | Gonzalez | A63F 13/655 463/25 |
| 2014/0297739 A1 * | 10/2014 | Stein | G06Q 30/0631 709/204 |
| 2015/0127663 A1 | 5/2015 | Tseng | |
| 2015/0161290 A1 | 6/2015 | Narayanan | |
| 2015/0301729 A1 * | 10/2015 | Wang | G06F 3/0485 715/707 |
| 2015/0317073 A1 | 11/2015 | Hull | |
| 2016/0110063 A1 | 4/2016 | Connolly | |
| 2016/0259519 A1 * | 9/2016 | Foss | G06F 3/0482 |
| 2016/0259528 A1 * | 9/2016 | Foss | G06F 3/0482 |
| 2016/0299497 A1 * | 10/2016 | McLaughlin | G05B 19/4185 |

\* cited by examiner

BLINDER AVOIDANCE IN SOCIAL NETWORK INTERACTIONS

CROSS-REFERENCE TO RELATED APPLICATIONS

This application is a Continuation of U.S. patent application Ser. No. 15/853,953, filed Dec. 25, 2017, which is a Continuation of U.S. patent application Ser. No. 14/631,811 filed Feb. 25, 2015, the entirety of each which is incorporated herein by reference.

BACKGROUND OF THE INVENTION

Field of the Invention

The present invention relates to social network content aggregation and more particularly to presenting social network updates in a user interface.

Description of the Related Art

Social networking refers to the electronic aggregation of social relations among individuals who share interests, activities, backgrounds or real-life connections. A social networking service generally provides for a representation of each participant, often referred to as a "profile", one or more connections to other participants in the network, as well as other logical functions operating upon those connections. Social networking services generally are provided by way of the World Wide Web ("Web"). The user interface to a Web-based social networking service typically provides controls allowing users to manage respectively different public profiles, to manage respectively different lists of other end connected users, and most importantly, to view status updates and other content produced by or in association with the connected users.

Generally, status updates and other content produced by or in association with the connections of an user are presented in a stream. Classical terms for the stream include a wall, timeline or feed. As such, a review of the stream will reveal to the user the contemporaneous goings-on with a social network of connections of the user. For social networks of limited connections, or for social networks of limited updates, ascertaining the state of the social network is as simple as perusing the stream. However, for larger social networks, or for networks of particularly dense streams, the user bears the risk of missing content due to the sheer volume of entries in the stream. This phenomena has been referred to as "banner blindness".

Banner blindness is a phenomenon in the study of human factors in which visitors to a Web site consciously or subconsciously ignore banner-like information and other visually presented advertisements. Banner blindness as a phenomenon has been recognized outside the context of online advertising in connection with a simple overflow of disparately sourced content on a single Web page. In the context of social networking, a stream of status updates that is voluminous and consumes a substantial portion of a page can result in banner blindness just as if the status updates were banner advertisements. Further, the requirement to scroll through or page through a multiplicity of different entries in a feed can result in the overlooking of important entries—just as in banner blindness.

BRIEF SUMMARY OF THE INVENTION

Embodiments of the present invention address deficiencies of the art in respect to social networking update presentation management and provide a novel and non-obvious method, system and computer program product for blinder avoidance in social networking interactions. In an embodiment of the invention, a method for blinder avoidance in social networking interactions is provided. The method includes executing a social networking data processing system in memory of a host computing system to provide a social networking service to different users in a social network. The method also includes defining in memory of the host computing system a user interface interaction for a user interface of the social networking service, and a corresponding user interface change in connection with a presentation of a status update for an user in different streams of other users of the social networking service. As such, in response to detecting the user interface interaction in the user interface with respect to a stream of status updates presented to one of the other users of the social networking service, the corresponding user interface change is performed in the user interface in connection with the presentation of the status update for the user in the stream presented to the one of the other users of the social networking service.

In one aspect of the embodiment, the user interface interaction is a fast scroll action or a slow scroll action. In another aspect of the embodiment, the user interface interaction is a page up or down action. In yet another aspect of the embodiment, the user interface interaction is an eye gaze tracking action. In even yet another aspect of the embodiment, the corresponding user interface change is an enlargement of the status update of the user or an enlargement of a profile avatar presented in connection with the status update of the user. Alternatively, the user interface change is a visual decoration of the status update with an alert.

In another embodiment of the invention, a social networking data processing system is configured for blinder avoidance in social networking interactions. The system includes a host computing system that includes one or more servers, each with memory and at least one microprocessor. The system also includes a social networking data processing system executing in the memory of the host computing system to provide a social networking service to different users in a social network. The system yet further includes a multiplicity of streams of status updates for ones of the different users displayed in respectively different user interfaces of the social networking data processing system for respectively different ones of the different users. Finally, the system includes a blinder avoidance module executing in the memory of the host computing system.

The module includes program code enabled upon execution in the memory of the host computing system to define in memory of the host computing system a user interface interaction for a user interface of the social networking service, and a corresponding user interface change in connection with a presentation of a status update for one of the different users in different ones of the streams. The module further includes program code enabled upon execution in the memory of the host computing system to respond to a detection of the user interface interaction in one of the different user interfaces with respect to a stream of status updates presented to a corresponding one of the different users, by performing the corresponding user interface change in the one of the different user interfaces in connection with the presentation of the status update for the one of the different users in the stream presented to the one of the different users.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for blinder avoidance in social networking interactions. In accordance with an embodiment of the invention, an user registered in a social networking system and enjoying one or more social networking connections with other users registered in the social networking system, can define a user interface interaction and corresponding user interface change in connection with the presentation of a status change for the user in the different feeds of the other users. For instance, the user interface interaction can be a fast scroll action, a slow scroll action, a page up or down action, or an eye gaze tracking action. The corresponding user interface change can include an enlargement of the status update of the user or an enlargement of a profile avatar presented in connection with the status update of the user, or the visual decoration of the status update with an alert. In any case, by allowing the user interface change to occur in response to detecting the corresponding user interface interaction, the opportunity for banner blindness in connection with the status update can be reduced.

Figure 1:
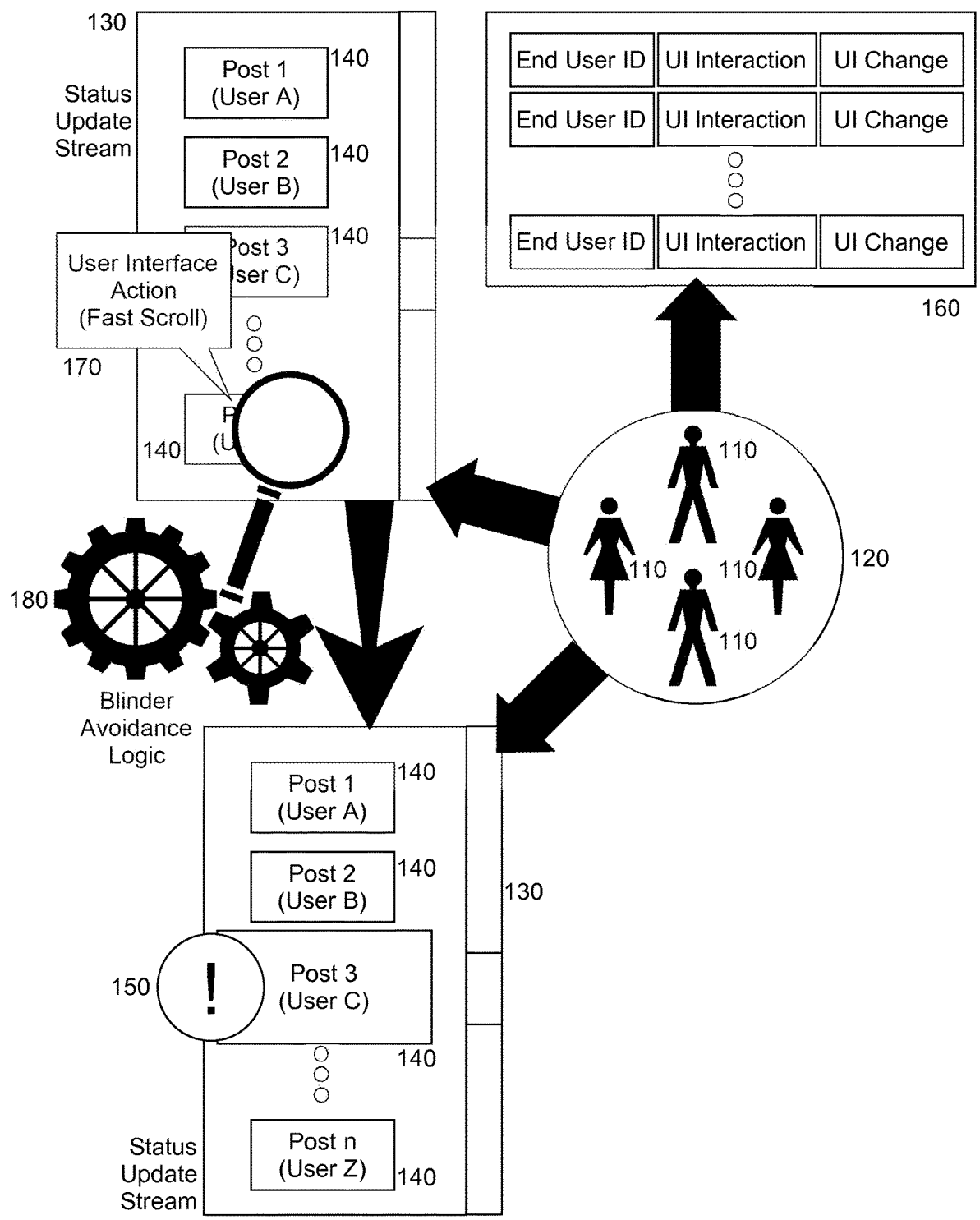
FIG. 1 is a pictorial illustration of a process for blinder avoidance in social networking interactions.

In further illustration, FIG. 1 pictorially illustrates a process for blinder avoidance in social networking interactions. As shown in FIG. 1, a group of users 110 connected to one another in a social network 120 each can view a different stream 130 of user updates 140 in a correspondingly different user interface to a social networking system managing the social network 120. Each of the user updates 140 can be a status update of a particular one of the users 110, or content generated in connection with a particular one of the users 110.

Of note, one or more user interface interactions with respect to the stream 130 can be defined in a table 160 in association with a corresponding user interface change and an user identifier to which the user interface change is to be applied. For instance, the user interface interaction can be a fast scroll action, a slow scroll action, a page up or down action, or an eye gaze tracking action. The corresponding user interface change can include an enlargement of a status update for an user specified by the user identifier, or an enlargement of a profile avatar presented in connection with the status update of the user specified by the user identifier, or the visual decoration of the status update with an alert. Other possibilities include a re-arrangement of the status updates in the stream 130.

Thereafter, blinder avoidance logic 180 can monitor the user interactions of each user 110 in connection with a corresponding stream 130. Upon detecting a user interface interaction 170 specified in the table 160, the blinder avoidance logic 180 can determine whether or not one of the status updates 140 in a stream 130 is associated with an user 110 having an user identifier corresponding to the detected user interface interaction 170 in the table 160. To the extent that the blinder avoidance logic 180 locates a status update 140 within the stream associated with the user 110 having the user identifier for the detected user interface interaction 170, the blinder avoidance logic can cause a change in the presentation of the status update 140 in the stream 130, for example by enlarging a size of the status update 140, or by decorating the status update 140 with a visual decorator 150 such as an icon, or by enlarging a profile avatar for or image of the user 110 associated with the status update 140, or by changing a profile avatar for or image of the user 110 associated with the status update 140 to an alternative avatar or image.

Figure 2:
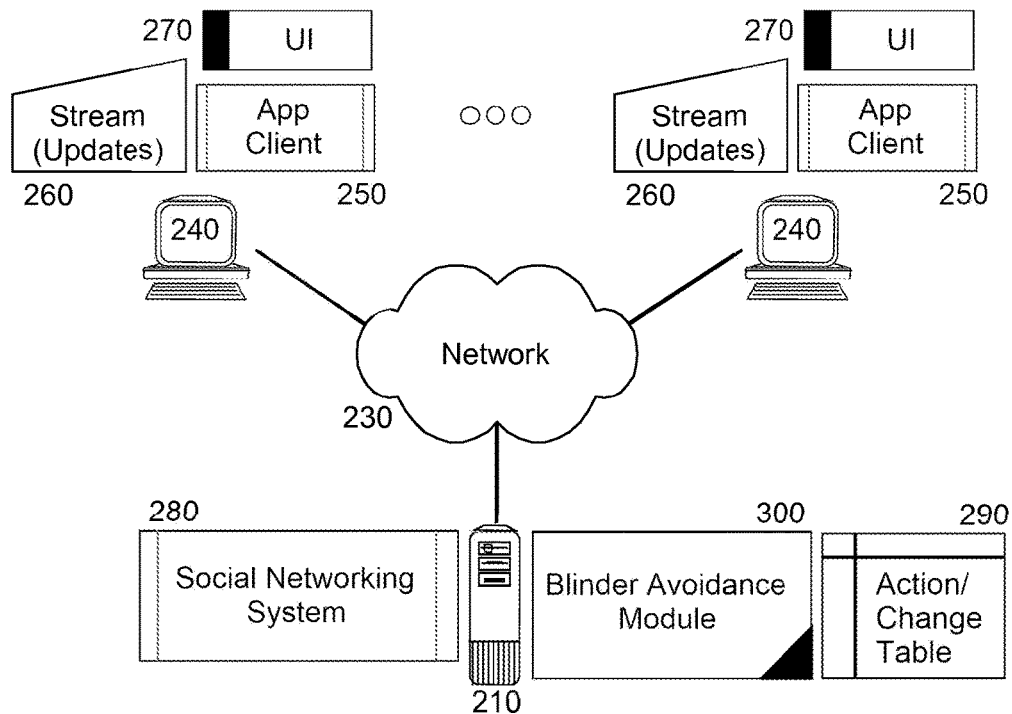
FIG. 2 is a schematic illustration of a social networking data processing system configured for blinder avoidance in social networking interactions; and, FIG. 3 is a flow chart illustrating a process for blinder avoidance in social networking interactions.

The process described in connection with FIG. 1 can be implemented in a social networking data processing system. In yet further illustration, FIG. 2 schematically shows a social networking data processing system configured for blinder avoidance in social networking interactions. The system includes a host computing system 210 that can include one or more host server computers, each with memory and at least one processor. The host computing system 210 can support the execution of a social networking system 280 providing management services for a social network of different users, each accessing the social networking system 280 from over a computer communications network 230 by way of respectively different client computers 240 hosting the execution of an application client 250. Each application client 250 in turn can include a display in a user interface 270 of a stream 260 of status updates for different users in the social network.

Notably, a blinder avoidance module 300 can be coupled to the social networking system 280. The module 300 can include program code that when executed in the memory of the host computing system 210, is enabled to store in a table 290 different specified user interface interactions, such as a fast scroll action in which the scroll speed of a scrollable user interface control hosting the stream 260 exceeds a threshold value, a slow scroll action in which the scroll speed of a scrollable user interface control hosting the stream 260 falls below a threshold value, a page up or down action, or an eye gaze tracking action such as a gaze tracking action detecting a stare away from the stream 260, or a gaze tracking action detecting a rapid change in focus of an user upon different locations on the user interface 270. The program code is further enabled to store in the table 290 in connection with each of the user interface interactions, one or more corresponding user interface changes, such as an enlargement of the status update of an user in the stream 260, or an enlargement of a profile avatar presented in connection with the status update of the user in the stream 260, or the visual decoration of the status update with an icon in the stream 260.

The program code of the blinder avoidance module 300 yet further can be enabled to monitor the stream 260 of each user in a respectively different user interface 270 so as to detect the occurrence of a user interface interaction. In response to detecting a user interface interaction, the program code of the blinder avoidance module 300 is enabled to determine a corresponding user status update change in the table 290 to be applied to a status update for a particular user also associated with the detected user interface interaction in the table 290. Thereafter, the program code of the blinder avoidance module 300 is enabled to apply the determined status update change to the presentation in the stream 260 of the status update.

Figure 3:
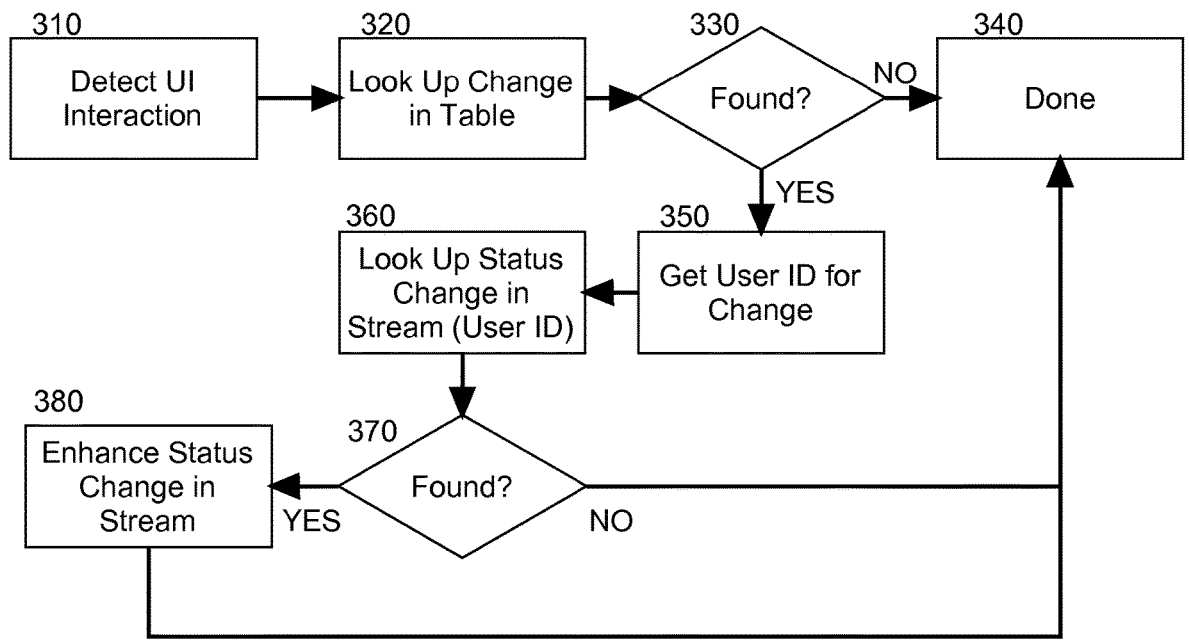

In even yet further illustration of the operation of the blinder avoidance module 300, FIG. 3 is a flow chart illustrating a process for blinder avoidance in social networking interactions. Beginning in block 310, a user interface interaction is detected in connection with a stream of a user interface presenting different status updates of respectively different users in a social network. In block 320, the table can be consulted in respect to the detected user interface interaction so as to determine in decision block 330 if a corresponding status update change can be located. If not, the process can end in block 340. Otherwise, in block 350 a user identifier for the located status update change can be determined and in block 360, a status update in the stream can be inspected to determine if a status update is presented in connection with an user of the social network having the determined user identifier. In decision block 370, if a status update can be located in the stream in connection with an user of the social network having the determined user identifier, in block 380, the presentation of the status update in the stream can be changed in accordance with the status update change corresponding to the detected user interface interaction.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for blinder avoidance in social networking interactions, the method comprising:

executing a social networking data processing system in memory of a host computing system to provide a social networking service to different users in a social network;

defining in memory of the host computing system a user interface interaction for a user interface of the social networking service, the user interface action acting to scroll the user interface in a specified direction so as to change content viewable within the user interface, and a corresponding user interface change in connection with a presentation of a status update for a user in different streams of other users of the social networking service, the user interface change emphasizing the status update for the user so as to make the status change less likely to go unnoticed despite the user interface action scrolling the user interface; and, responsive to detecting the user interface interaction in the user interface with respect to a stream of status updates presented to one of the other users of the social networking service, performing the corresponding user interface change in the user interface in connection with the presentation of the status update for the user in the stream presented to the one of the other users of the social networking service.

2. The method of claim 1, wherein the user interface interaction is a fast scroll action or a slow scroll action.

3. The method of claim 1, wherein the user interface interaction is a page up or down action.

4. The method of claim 1, wherein the user interface interaction is an eye gaze tracking action.

5. The method of claim 1, wherein the corresponding user interface change is an enlargement of the status update of the user or a change in a profile avatar presented in connection with the status update of the user.

6. The method of claim 1, wherein the user interface change is a visual decoration of the status update.

7. A social networking data processing system configured for blinder avoidance in social networking interactions, the system comprising:

a host computing system comprising one or more servers, each with memory and at least one microprocessor;

a social networking data processing system executing in the memory of the host computing system to provide a social networking service to different users in a social network;

a multiplicity of streams of status updates for ones of the different users displayed in respectively different user interfaces of the social networking data processing system for respectively different ones of the different users; and, a blinder avoidance module executing in the memory of the host computing system, the module comprising program code enabled upon execution in the memory of the host computing system:

to define in memory of the host computing system a user interface interaction for a user interface of the social networking service, the user interface action acting to scroll the user interface in a specified direction so as to change content viewable within the user interface, and a corresponding user interface change in connection with a presentation of a status update for a user in different streams of other users of the social networking service, the user interface change emphasizing the status update for the user so as to make the status change less likely to go unnoticed despite the user interface action scrolling the user interface, and to respond to a detection of the user interface interaction in one of the different user interfaces with respect to a stream of status updates presented to a corresponding one of the different users, by performing the corresponding user interface change in the one of the different user interfaces in connection with the presentation of the status update for the one of the different users in the stream presented to the one of the different users.

8. The system of claim 7, wherein the user interface interaction is a fast scroll action or a slow scroll action.

9. The system of claim 7, wherein the user interface interaction is a page up or down action.

10. The system of claim 7, wherein the user interface interaction is an eye gaze tracking action.

11. The system of claim 7, wherein the corresponding user interface change is an enlargement of the status update of the user or a change in a profile avatar presented in connection with the status update of the user.

12. The system of claim 7, wherein the user interface change is a visual decoration of the status update.

13. A computer program product for blinder avoidance in social networking interactions, the computer program product comprising a non-transitory computer readable storage medium having program instructions embodied therewith, the program instructions executable by a device to cause the device to perform a method comprising:

executing a social networking data processing system in memory of a host computing system to provide a social networking service to different users in a social network;

defining in memory of the host computing system a user interface interaction for a user interface of the social networking service, the user interface action acting to scroll the user interface in a specified direction so as to change content viewable within the user interface, and a corresponding user interface change in connection with a presentation of a status update for a user in different streams of other users of the social networking service, the user interface change emphasizing the status update for the user so as to make the status change less likely to go unnoticed despite the user interface action scrolling the user interface; and, responsive to detecting the user interface interaction in the user interface with respect to a stream of status updates presented to one of the other users of the social networking service, performing the corresponding user interface change in the user interface in connection with the presentation of the status update for the user in the stream presented to the one of the other users of the social networking service.

14. The computer program product of claim 13, wherein the user interface interaction is a fast scroll action or a slow scroll action.

15. The computer program product of claim 13, wherein the user interface interaction is a page up or down action.

16. The computer program product of claim 13, wherein the user interface interaction is an eye gaze tracking action.

17. The computer program product of claim 13, wherein the corresponding user interface change is an enlargement of the status update of the user or a change in a profile avatar presented in connection with the status update of the user.

18. The computer program product of claim 13, wherein the user interface change is a visual decoration of the status update with an alert.

* * * * *